United States Patent [19]
Smith et al.

[11] Patent Number: 6,068,061
[45] Date of Patent: May 30, 2000

[54] SOIL ZONE-BUILDER COULTER CLOSER/ TILLER WITH VERTICAL RESPONSE MECHANISM AND SHANK HEAD

[75] Inventors: David R. Smith, Fort Jennings; William C. Maenle, Ottoville, both of Ohio

[73] Assignee: Unverferth Manufacturing Co., Inc., Kalida, Ohio

[21] Appl. No.: 09/057,439

[22] Filed: Apr. 9, 1998

[51] Int. Cl.[7] .............................. A01B 13/08; A01B 61/00
[52] U.S. Cl. .......................... 172/139; 172/151; 172/166; 172/176; 172/196; 172/264; 172/624.5
[58] Field of Search ................................. 172/624.5, 624, 172/196, 151, 149, 150, 176, 139, 166, 264–267

[56] References Cited

U.S. PATENT DOCUMENTS

| | | |
|---|---|---|
| 2,677,339 | 5/1954 | Armstrong et al. . |
| 2,734,439 | 2/1956 | Padrick . |
| 3,708,019 | 1/1973 | Ryan ........................................ 172/470 |
| 4,213,408 | 7/1980 | West et al. .................................. 111/85 |
| 4,524,837 | 6/1985 | Harden ..................................... 172/156 |
| 4,548,277 | 10/1985 | Dietrich, Sr. et al. ................... 172/265 |
| 5,255,617 | 10/1993 | Williams et al. ......................... 111/140 |
| 5,333,694 | 8/1994 | Roggenbuck et al. ................... 172/156 |
| 5,361,848 | 11/1994 | Fleischer et al. ........................ 172/140 |
| 5,458,203 | 10/1995 | Evers ....................................... 172/569 |
| 5,474,135 | 12/1995 | Schlagel .................................. 172/151 |
| 5,477,792 | 12/1995 | Bassett et al. ........................... 111/121 |
| 5,529,128 | 6/1996 | Peterson et al. ......................... 172/145 |
| 5,531,171 | 7/1996 | Whitesel et al. ......................... 111/121 |
| 5,623,997 | 4/1997 | Rawson et al. .......................... 172/156 |
| 5,640,914 | 6/1997 | Rawson .................................... 111/140 |
| 5,797,460 | 8/1998 | Parker et al. ..................... 172/624.5 X |

OTHER PUBLICATIONS

Bushhog® Allied Products Corporation, "Become A Part of The Tillage Revolution", brochure, pp. 3, Date Unknown.
Southeast Farm Press, "Tennessee Valley cotton growers find modified strip–till system works well", Aug. 7, 1996, p. 8.
Manufacturrs Farmers Hot Line, "800–247–2000", Fall/ WInter 1994, p. 46.
BB Bigham Brothers, Inc., "RowTill Ripper B–19", pp. 2 May 1991.
Ferguson Manufacturing Co., Inc., "The Ferguson Rip–Strip–Till", pp. 2, Date Unknown.

(List continued on next page.)

*Primary Examiner*—Christopher J. Novosad
*Attorney, Agent, or Firm*—Rothwell, Figg, Ernst & Kurz, p.c.

[57] ABSTRACT

An apparatus and method for tilling a seedbed with a soil manipulation device comprising a tilling shank for forming a groove in the soil followed a pair of coulter blades for closing the groove and a rear finishing device such as a rolling basket for further tilling and firming of the soil with improved coulter downward pressure and shank head. Downward pressure on the coulter blades is provided by a coulter spring attached to a lever arm pivotally attached to the framework which applies downward pressure to the framework supporting the coulter blades. The rear finishing device is connected to the same coulter support framework by a pivotal rear arm and a rear arm spring such that when the rear finishing device is displaced upward by changing field conditions, an upward force is imparted to the coulter support framework thus raising the coulter blades in response to changing field conditions. Further, a shank head is disclosed which has narrow leading center point flanked on either side by secondary points placed behind the behind the center point and which breaks up soil hardpan with a minimum of soil disturbance at the surface.

20 Claims, 7 Drawing Sheets

OTHER PUBLICATIONS

Kelley Manufacturing Co., "Subsoil No–Till Planter With Rip/Strip" pp. 2, Date Unknown.

Schlagel Manufacturing, Inc., "Till–N–Plant", pp. 4, Date Unknown.

Bushhog®, "Ro–Till" & 8200 Series Ro–Till, pp. 4, Date Unknown.

Powell Manufacturing Company, Inc., "Ro–Till", pp. 4, Date Unknown.

Yetter Manufacturing Company Catalogue, "Yetter . . . for land's sake!", pp. 3 and 15, Date Unknown.

Yetter Manufacturing Company '95/'96 Product Catalogue, "Yetter/best on earth", pp. 16, 17 and 22–25, Date Unknown.

Kinze Manufacturing Inc., "Kinze 2000 Series Planters", pp. 5 and 9, Date Unknown.

Yetter Manufacturing Company '94/'95 Product Catalogue, "Yetter/The Only Choice", pp. 3, 10, 11 and 15, Date Unknown.

Great Plains Acceptance Corporation Catalogue, "Great Plains/Specialists in the Science of Seed Placement", p. 8, Date Unknown.

SOIL ZONE-BUILDER COULTER CLOSER/TILLER WITH VERTICAL RESPONSE MECHANISM AND SHANK HEAD

BACKGROUND OF THE INVENTION

1. Field of the Invention

The present invention relates to the field of soil manipulation devices for agricultural use.

2. Description of the Background Art

There are several ways in which farm land is prepared for planting or seeding. In the past, the land was turned over by a plow, cut by disks, pulverized by a harrow, etc. However, preparing the soil in this manner is less desirable or unacceptable in some circumstances due to erosion problems caused by use of the above apparatus, particularly such use on contoured land. Thus, there has been significant interest in "low-till" and "no-till" farming, which, rather than turning over and tilling an entire field, tills only spaced strips of soil. This method of soil preparation reduces the damaging effects of erosion on the soil.

The strips of soil are tilled by tools which penetrate the surface of the soil and form a seedbed area for planting. The apparatus may use a fixed tiller point to till the soil, or rotatable coulter wheels or disks to cut and mix the soil, followed by a penetrating blade for additional cultivation of the soil. In addition, apparatus for penetrating the soil hardpan to form a passage therein beneath the seedbed may be used as well. The tillage apparatus may be followed by a planter or drill which places seed in the seedbed prepared along each strip of soil. Alternatively, the soil can be tilled in the fall to form a bed which can be seeded the following spring.

There remains a need in the art for improved apparatus for soil manipulation and preparation of seedbeds and specifically in providing an apparatus which can adapt downward coulter force to changing field conditions and also in providing an apparatus for breaking up soil hardpan while minimizing surface soil disturbance.

SUMMARY OF THE INVENTION

In accordance with the present invention, a soil manipulation device is provided for closing a groove in soil formed by a soil tiller shank. The device includes a frame for being connected to the soil tiller shank, a pair of rotatable coulter blades, and rear finishing device. The pair of rotatable coulter blades is mounted on the frame for engaging soil behind or beside the tiller shank. The coulter blades are positioned on opposite sides of the groove, so as to close the groove formed in the soil behind the tiller shank. Proper downward pressure on the coulter blades is maintained in spite of changing field conditions, in part, because vertical displacement of the rear finishing device is communicated to the frame providing a counter force to the downward coulter force.

Further, in preferred embodiment, the shank features a center point with raised narrow center section with narrow leading edges behind and on either side of the center section which shatters the soil hardpan while reducing soil disturbance at the surface.

BRIEF DESCRIPTION OF THE DRAWINGS

PIG. 6c is a perspective view from the rear of the embodiment shown in 6a above.

DETAILED DESCRIPTION OF THE INVENTION

Figure 1:
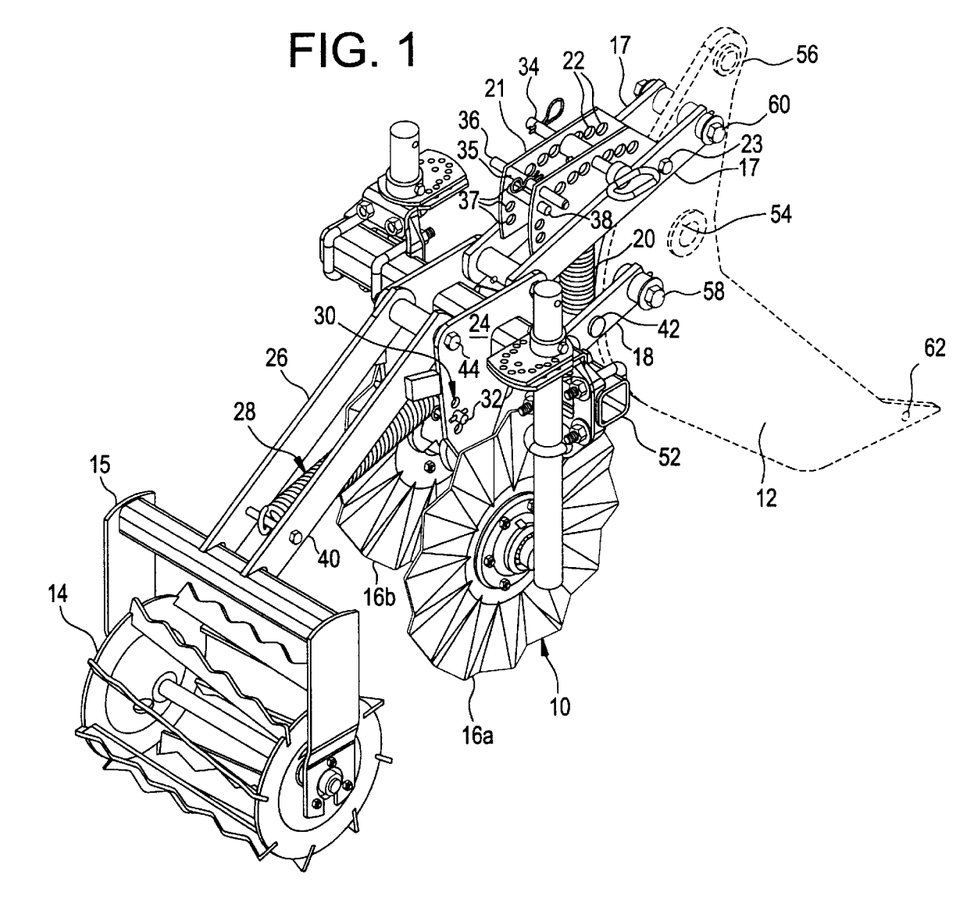
FIG. 1 is a perspective view showing a zone-builder coulter closer and tiller in accordance with one embodiment of the present invention utilizing fluted coulter blades.

The closer 10 of the present invention is adapted to be connected to and mounted behind a soil tiller shank 12 as shown in FIG. 1 which depicts a preferred embodiment of the present invention. The tiller shank 12 is adapted to be mounted on the tool bar of a farm implement (not shown) such as disclosed in U.S. Pat. No. 5,370,068 or U.S. Pat. No. 5,640,914, both incorporated herein by reference. As will be seen from the incorporated references, the tiller shank 12 is adapted to receive mounting hardware at mounting holes 54 and 56.

The closer 10 is an agricultural tillage attachment for closing the groove made by tiller shank 12 while soil is being tilled, to create a zone of soil in which seed may be planted. The closer 10 includes a frame 14 for being connected to tiller shank 12. Closer 10 includes a pair of rotatable coulter blades 16a, 16b which are mounted on frame 14 for engaging soil behind or beside tiller shank 12. In the embodiment shown in FIG. 1, coulter blades 16a, 16b are fluted. Alternatively, the blades can be disk blades (not shown). In either case, the blades 16a, 16b may be adjusted (a) vertically—to allow for an increase or decrease in working depth pressure, (b) horizontally relative to each other—to allow for varying zone width, and (c) angularly to present either blade 16a, 16b independently or together at a particular angle with respect to the soil surface. The blades may be adjusted in the manner disclosed in U.S. Pat. No. 5,623,997 which is incorporated herein by reference (and which also provides an example of disc blades at FIG. 3—elements 16c and 16d).

Figure 2:
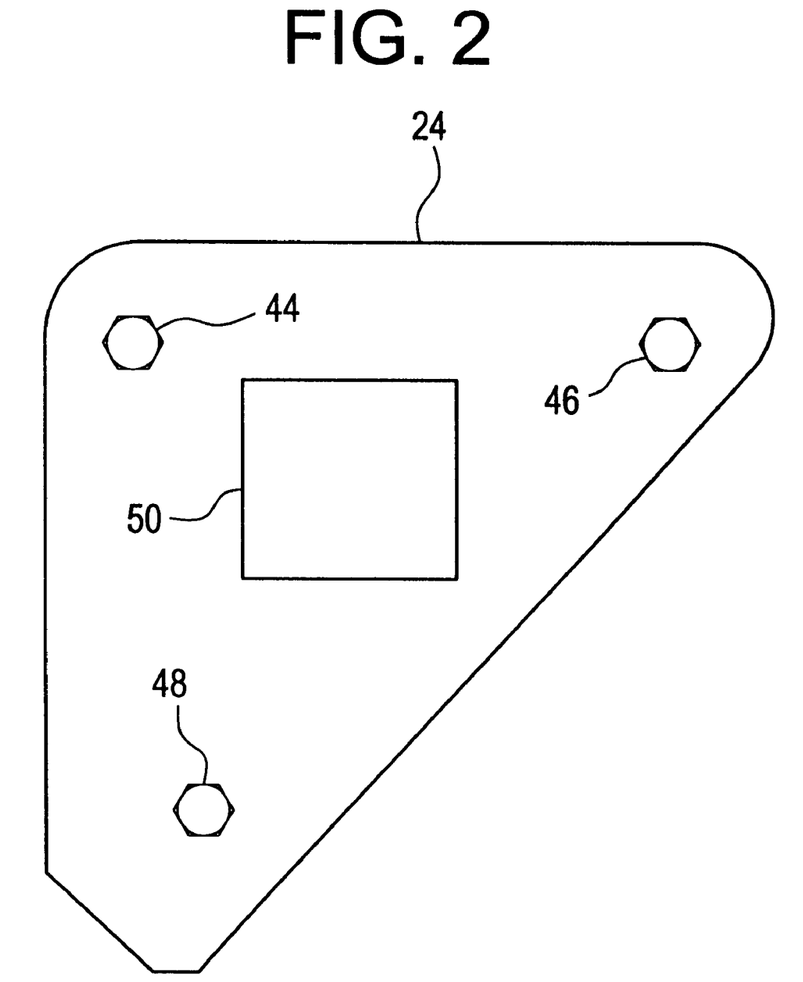
FIG. 2 is a view of one of the plates of the connector assembly of the embodiment shown in FIG. 1.

With reference to FIGS. 1 and 2, the closer 10 is mounted on a support bar 52 which passes through opening 50 in the connector assembly 24. Accordingly, when connector assembly 24 is raised or lowered, the closer 10 and its coulter blades 16a, 16b are also raised or lowered. The upper parallel arm 17, the lower parallel arm 18, and rear arm 26 are pivotally connected to the connector assembly 24 by connection bolts 46, 48, and 44 respectively. Upper parallel arm 17 and lower parallel arm 18 are pivotally attached to the tilling shank 12 by connection bolts 60 and 58 respectively. Coulter spring 20 is anchored at its bottom end by connection bolt 42 and applies downward force to adjustment arm 21.

Adjustment arm 21 is pivotally connected to the upper parallel arm by connection bolt 23 and has plural coulter spring bias force settings 22 which are adapted to receive coulter spring bias force pin 34 to which the top end of the coulter spring 20 is attached. The adjustment arm 21 also has plural working depth settings 37 to adjust the working height of the frame (comprising the connector assembly 24, the upper and lower parallel arms 17, 18, and the rear arm 26) which are adapted to receive a working depth setting pin 38. The adjustment arm 21 also has a working depth setting which is a storage setting 35 which is adapted to receive a working depth stop pin 36. The stop pin 36 may be positioned in the storage setting 35 or in any of the working depth settings 37 at all times and represents a setting at which the coulter spring 20 applies downward force. When stop pin 36 is placed in storage position 35, the depth setting pin 38 serves as a positive working depth setting. The working depth setting pin 38 is designed to contact the upper parallel arm such that the downward force of the coulter spring 20 is thereby applied to the upper parallel arm 17 which in turn applies downward force to the connector assembly 24 and ultimately to the coulter blades 16a, 16b.

The working depth setting pin 36 (or the stop pin 38) position serves as a gauge in determining when coulter spring biasing force on the upper and lower parallel arms 17, 18 begins. As the tilling shank is placed into the soil to the desired working depth, as determined by machine gauge wheels and tractor depth settings (not shown) in any of the manners known to those of ordinary skill in the art, the coulters 16a, 16b and rear finishing device 14 penetrate the soil causing the upper and lower parallel arms 17, 18 to move upward (with no biasing force) until the upper parallel arm 17 contacts the working depth setting pin 36 (or the stop pin 38) causing coulter spring biasing force to begin.

The rear arm 26 is connected at its front end to the connector assembly 24 and at its rear end to a rear support frame 15 which supports a rear finishing device 14 which may be 12 to 15 inches wide and which is mounted perpendicularly with respect to the tilling shank 12. The rear finishing device may be any suitable rear finishing device such as the aggressive roller basket shown in FIG. 1 or a cultipacker such as that available for Allied Products Corporation's BUSHOG® 8200 series RO-TILL® product. The rear finishing device helps till and firm the soil, thus reducing inconsistencies in soil texture and allowing for spring tillage of a uniform seed bed, and can be followed by a planter or drill. Downward pressure on the rear finishing device 14 is applied through the rear support frame 15 by means of a rear arm spring 28 connected at its rear end to connection bolt 40 on the rear arm 26 and at its forward end to the connector assembly 24 by means of a rear arm spring bias pin 32 which may be selectively positioned in any one of the plural rear arm bias settings 30 on the connector assembly 24. Thus, the downward pressure on the rear finishing device 14 may be adjusted for varying soil conditions.

The rear finishing device 14 also acts as gauge wheel to help hold the depth of the coulter blades 16a, 16b in relation to ground depth. When the rear finishing device 14 and rear support frame 15 are vertically displaced upwards, the rear arm 26 moves upward pivotally about the connection bolt 44 and, because of the rear arm spring 28 which counters the pivotal movement somewhat, the rear arm 26 applies upward force to the connection assembly 24. The upward force to the connection assembly 24, as explained above, raises the coulter blades 16a and 16b in response to the change in the field condition which caused the vertical displacement of the rear finishing device 14 and rear support frame 16.

Figure 5:
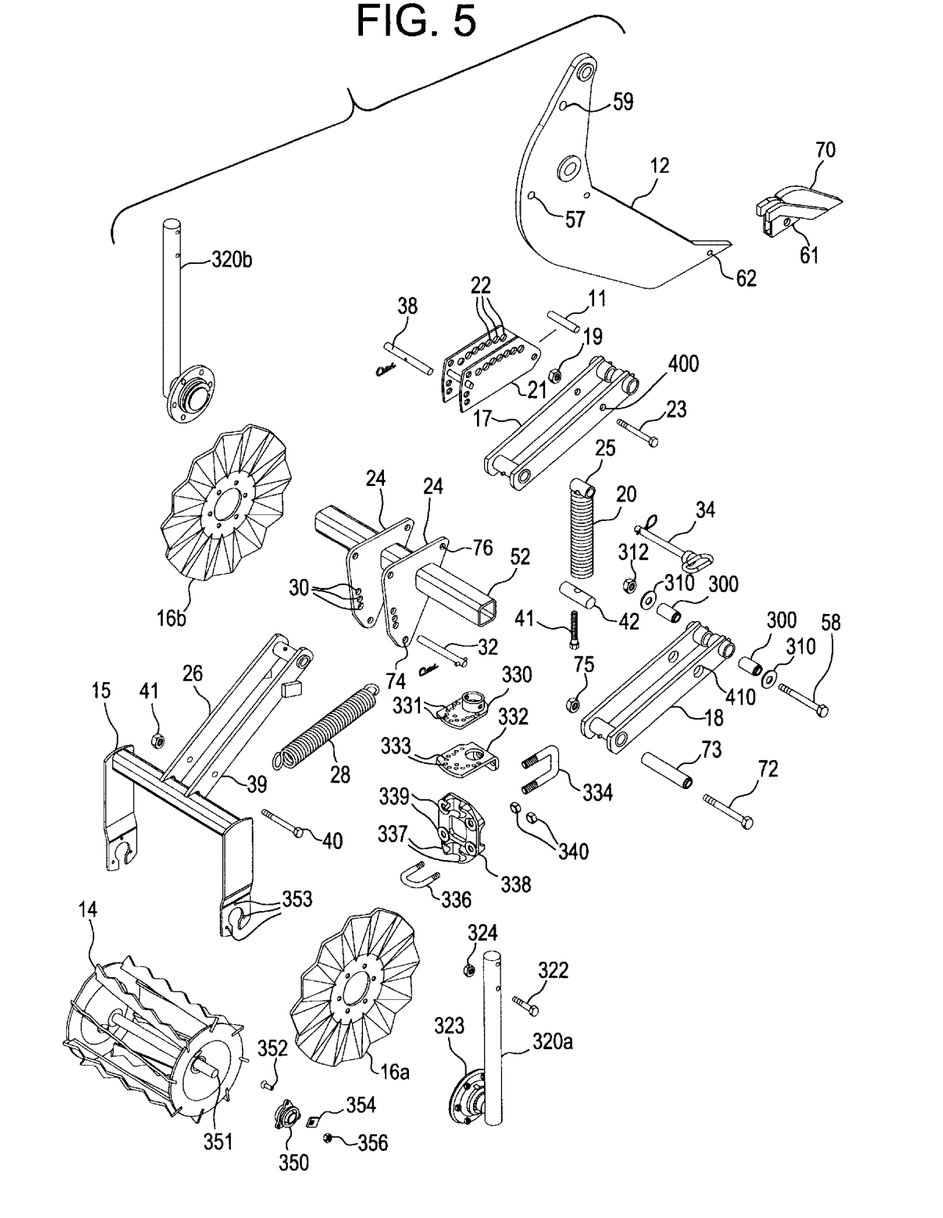
FIG. 5 is an exploded perspective view of the device shown in FIG. 1.

With reference to FIG. 1 and FIG. 5, it will be readily apparent to those of skill in the art that the lower parallel arm 18 is attached to the shank 12 at the lower shank connection hole 57 by means of the lower shank connection bolt 58 in combination with washers 310, bushings 300 and nut 312. The upper parallel arm 17 is similarly attached to the shank 12 at the upper shank connection hole 59 with a connection bolt 60 and bushings, washers and nut which are not shown. Lower parallel arm 18 is attached to connector assembly 24 at lower assembly mounting hole 74 by means of a lower assembly connection bolt 72 in conjunction with a bushing 73 and a nut 75. Similarly, the upper parallel arm 17 is connected to the connector assembly at the upper assembly mounting hole 76 by means of a connection bolt bushing and nut, not shown. The adjustment arm 21 is secured to the upper parallel arm at the adjustment arm mounting hole 400 by means of a connection bolt 23, bushing 11 and nut 19. The coulter spring 20 is secured at its upper end at any of the coulter spring bias force settings 22 by means of bushing 25 and coulter spring bias force pin 34. The coulter spring 20 is secured at its bottom end by means of a casting (not shown) in the inside bottom of spring 20, into which bolt 41 is threaded. The coulters 16a and 16b are attached to coulter arms 320a and 320b by means of a hub 323 on each of the coulter arms 320a and 320b. The hub 23 is fixed to a coulter by means of nuts and bolts not shown. The coulter arms 320a, 320b are attached to the support bar 52 by means of a top coulter angle plate 330, a bottom coulter angle plate 332, a coulter arm connection plate 338, a small U-brace 336, two large U-braces 334 (one large U-brace not shown), nuts 340 and other nuts not shown. On each of the coulter arms 320a and 320b, a connection bolt 322 and nut 324 fix the collar of top coulter angle plate 330 to the coulter arms 320a, 320b such that when the coulter plate 16a or 16b to which the plate is attached (via the arm and hub) is rotated, the top plate 330 is also rotated. Such a rotated position may be held by lining up a coulter angle setting 331 with a receiving hole 333 and inserting a pin (not shown) into the aligned holes.

With continued reference to FIGS. 1 and 5, the rear arm spring 28 is secured at its front end to the connector assembly 24 at any of the rear arm bias settings 30 by means of a rear arm spring bias pin 32. The rear end of rear arm spring 28 is secured to the rear arm 26 at rear arm spring mounting hole 39 by means of rear arm spring connection bolt 40 and nut 41. The rear arm in turn is connected to rear support frame 15 which is connected to rear finishing device 14 by means of a hub 350 which fits over axel 351 and is secured to frame 15 at mounting points 353 by means of a bolt 352, a square washer 354 and a nut 356 (only one set of bolt, washer and nut are shown, but three sets per hub are used).

Shank center point is attached to the shank 12 at center point mounting hole 62 by passing a bolt through shank mounting hole 61 and center point mounting hole 62 and securing the bolt with a nut (nut and bolt not shown).

Figure 3:
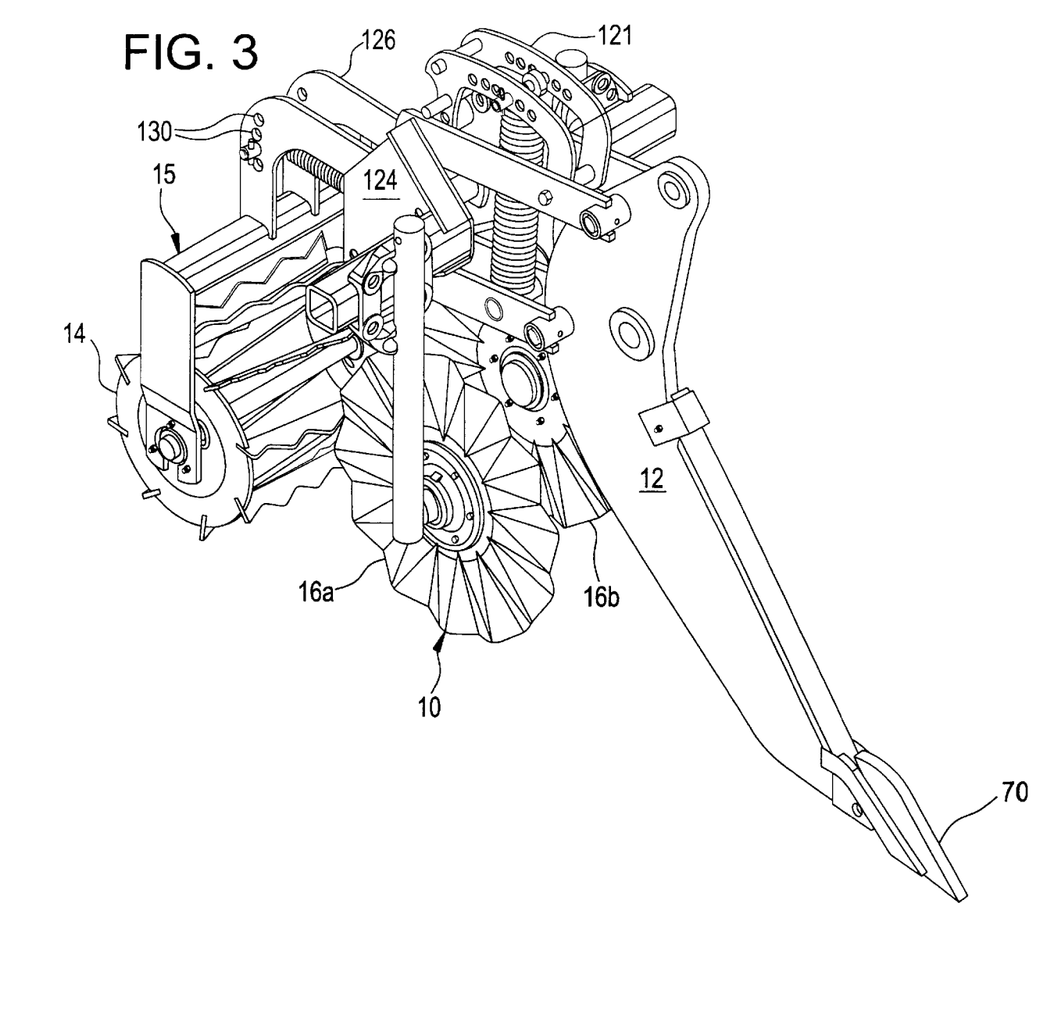
FIG. 3 is a perspective view of a second embodiment of the invention utilizing a different frame.

FIG. 3 represents a second preferred embodiment in which the rear arm is bent at approximately a 90° angle and the rear arm spring bias settings 130 are on the rear arm 126 instead of the connector assembly 124 as was the case in the first embodiment. The second embodiment also illustrates different designs for the adjustment arm 121 and the connector assembly 124 but the adjustment arm 121 and connector assembly 124 operate in substantially the same manner as the adjustment arm 21 and connector assembly 24 in the first embodiment.

Figure 4A:
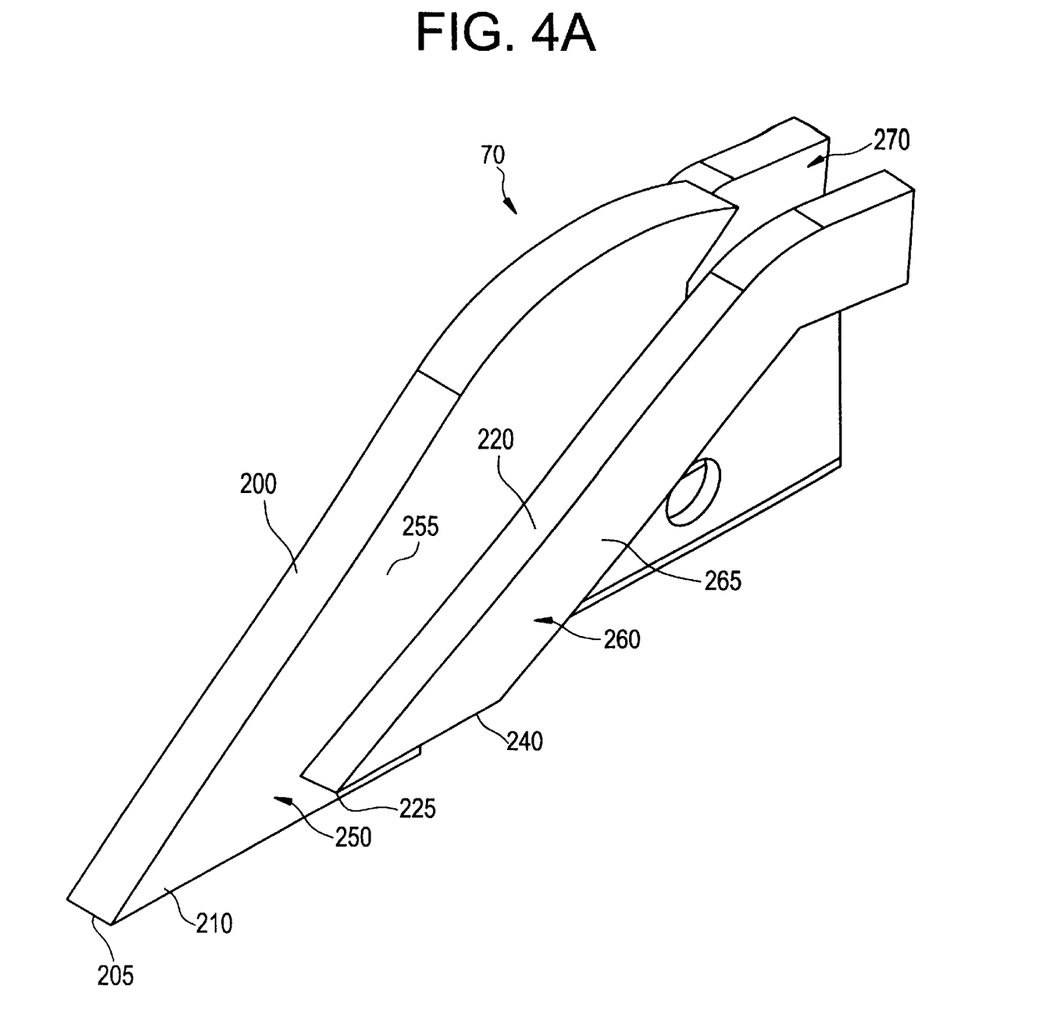
FIG. 4a is perspective view of an improved shank center point.
Figure 4B:
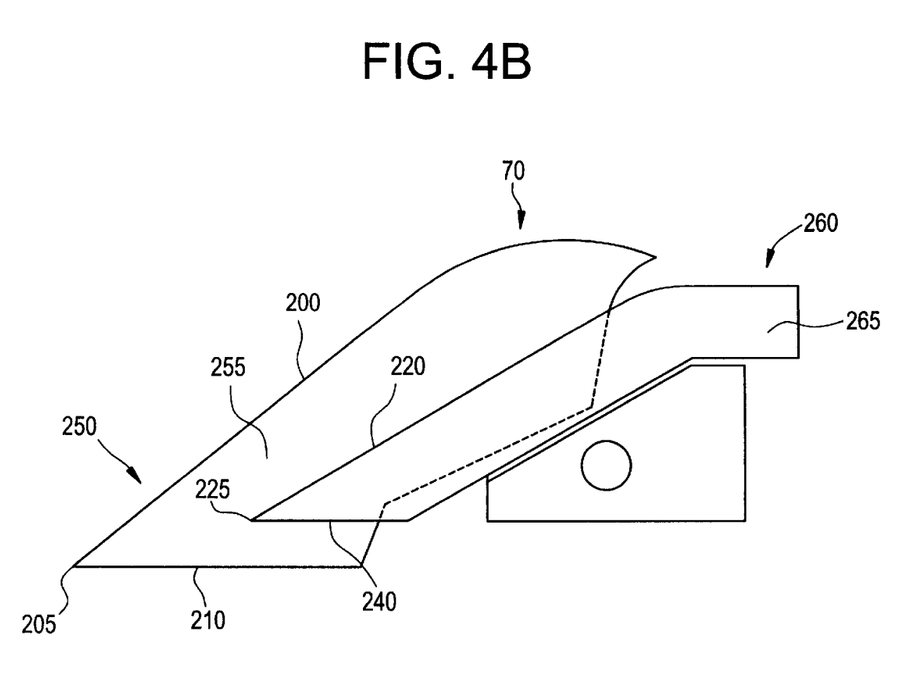
FIG. 4b is another view of the improved shank center point shown in 4a above.

FIG. 3 also depicts shank head 70 as it is attached to the shank 12. FIGS. 4a and 4b further illustrate the shank head 70. The shank head 70 is comprised of a center point 250 and is flanked on either side by identical secondary points 260 and 270. The center point 250 has a top surface 200, a bottom surface 210, a first side 255, and a second side (not shown) wherein said top surface 200 tapers to meet said bottom surface 210 thereby forming a center point leading edge 205. The secondary points 260 and 270 are identical and so only one secondary point will be described herein and will be referred to as the first secondary point 260. The first secondary point 260 is welded to the first side 255 of the center point 250 and has a top surface 220 and a bottom surface 240, wherein said top surface 220 tapers to meet said bottom surface 240 thereby forming a first secondary point leading edge 225. Most of the top surface 220 of the first secondary point 260 is lower than the top surface 200 of the center point 250 and the bottom surface 240 of the first secondary point 260 is higher than the bottom surface 210 of the center point 250.

The center point 250 is designed to shatter the hardpan with reduced soil disturbance by means of a raised forward narrow center section. This profile causes the center point leading edge 205 to force soil to flow in different directions as it is being shattered. As the soil starts to lift, the narrow high top surface 200 causes the soil to flow off the side, rather than being lifted by a flat straight wide tip surface as taught by the prior art. The secondary points 260 and 270 placed behind and off the side of the center point leading edge 205 cause further soil shattering and force the soil to flow in different directions.

Figure 6A:
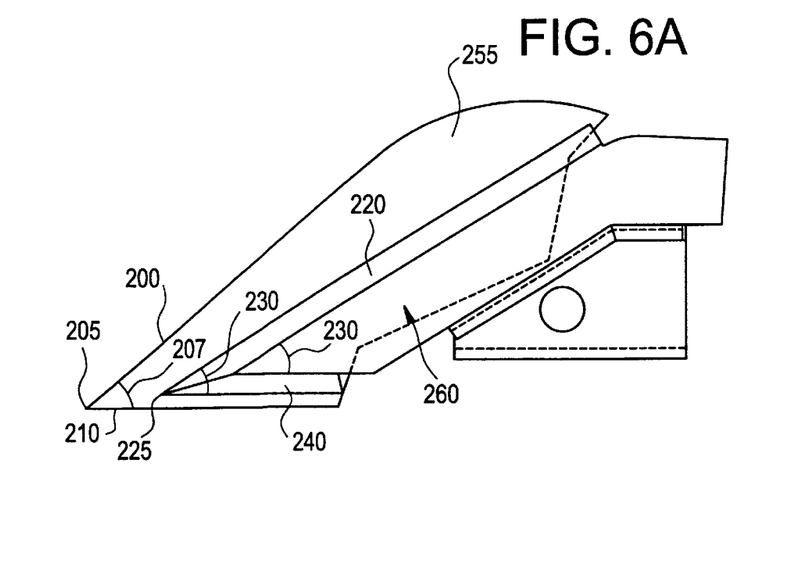
FIG. 6a is a perspective view of an embodiment of an improved shank center point.
Figure 6B:
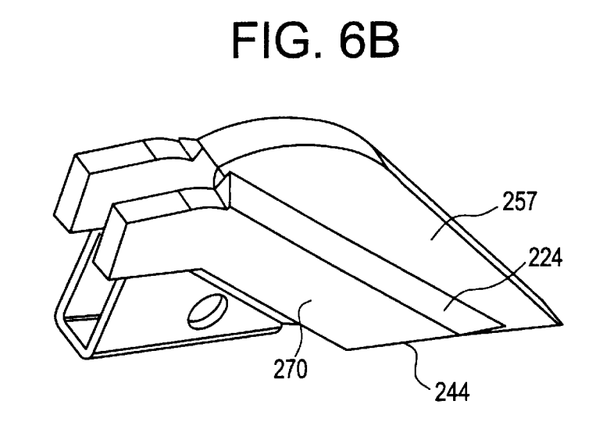
FIG. 6b is another perspective view of the embodiment shown in 6a above.
Figure 6C:
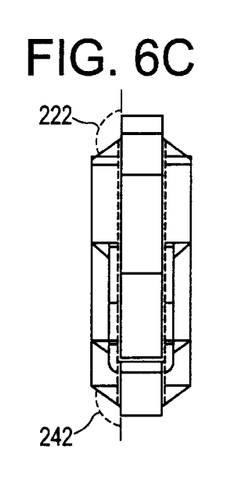

FIGS. 6A–6C represent various perspectives of another embodiment of the center point 250. Here too, the secondary points 250 and 270 are mirror images of one another and so only the first secondary point will be described except to point out that center point second side 257 corresponds to center point first side 255, second secondary point top surface 224 corresponds to first secondary point top surface 220, and second secondary point bottom surface 244 corresponds to first secondary point bottom surface 240. In this embodiment, the first secondary point top surface 220 has an angle 222 with respect to the center point first side 255 of about 120° to about 150° and is preferably 140°. The first secondary point bottom surface 240 has an angle 222 with respect to the center point first side 255 of about 120° to about 150° and is preferably 130°. The first secondary point bottom surface 240 forms an angle with center point first side 255 of about 120° to about 150° and preferably about 130°. The center point top surface 200 forms an angle 207 with center point bottom surface 210 of about 35° to about 45° and preferably 40°. The first secondary point top surface 220 forms an angle 230 with first secondary point bottom surface 240 of about 25° to about 35° and preferably 30°. The angles 207 and 230 are substantially the same in both embodiments.

Many modifications, variations and changes in detail may be made to the described embodiments, and it is intended that all matter in the foregoing description and as shown in the accompanying drawings be interpreted as illustrative and not in a limiting sense.

We claim:

1. A soil manipulating device comprising:
   a shank for tilling a seed bed and forming a groove in soil;
   a coulter blade assembly having a pair of coulter blades positioned behind said shank on opposite sides of said groove for closing said groove;
   a rear finishing device positioned behind said coulter blades;
   a framework connecting (a) said shank, (b) said coulter blade assembly, and (c) said rear finishing device, said framework having a dual arm linkage wherein said dual arms pivotably connect said coulter blade assembly to said shank and having a first variable bias force means having an initial bias force which communicates through said framework a downward biasing force to said coulter blade assembly; and
   wherein vertical displacement of said rear finishing device communicates an upward force through said framework to said coulter blades which is counter to said downward biasing force.

2. The soil manipulating device of claim 1 said framework further comprising:
   a rear arm having a front end and a rear end pivotally connected at said front end to said coulter blade assembly and connected at said rear end to said rear finishing device;
   a second variable force means having an initial bias force, a front end, and a rear end wherein said front end is connected to said coulter blade assembly and said rear end is connected to said rear arm; and
   wherein said second variable force means assists in communicating said upward force through said framework to said coulter blade assembly.

3. The soil manipulating device of claim 2 wherein said initial bias force of said second variable force means may be selected from one of plural predetermined force settings.

4. The soil manipulating device of claim 1 said framework further comprising a working depth adjuster for simultaneously setting the working height of said coulter blades and said rear finishing device in relation to the working depth of said shank.

5. The soil manipulating device of claim 4 said framework further comprising a bias force adjustment means for varying said initial bias force of said first variable bias force means.

6. The soil manipulating device of claim 1 wherein said rear finishing device is selected from the group of a rolling basket and a cultipacker.

7. The soil manipulating device of claim 1 wherein said shank further comprises:
   a center point having a top surface, a bottom surface, a first side, and a second side wherein said top surface tapers to meet said bottom surface thereby forming a center point leading edge;
   a first secondary point fixedly attached to said first side of said center point, said first secondary point having a top surface and a bottom surface, wherein said top surface tapers to meet said bottom surface thereby forming a first secondary point leading edge, wherein most of said top surface of said first secondary point is lower than said top surface of said center point and said bottom surface of said first secondary point is higher than said bottom surface of said center point; and
   a second secondary point fixedly attached to said second side of said center point, said second secondary point having a top surface and a bottom surface, wherein said top surface tapers to meet said bottom surface thereby forming a second secondary point leading edge, wherein most of said top surface of said second secondary point is lower than said top surface of said center point and said bottom surface of said second secondary point is higher than said bottom surface of said center point.

8. The soil manipulating device of claim 7 wherein said top surface of said first secondary point is oriented with respect to said first side of said center point at an angle of 120° to 150°;

said bottom surface of said first secondary point is oriented with respect to said first side of said center point at an angle of 120° to 150°;

said top surface of said first secondary point is oriented with respect to said bottom surface of said first secondary point at an angle of 25° to 35°;

said top surface of said center point is oriented with respect to said bottom surface of said center point at an angle of 35° to 45°;

said top surface of said second secondary point is oriented with respect to said first side of said center point at an angle of 120° to 150°;

said bottom surface of said second secondary point is oriented with respect to said first side of said center point at an angle of 120° to 150°; and said top surface of said second secondary point is oriented with respect to said bottom surface of said second secondary point at an angle of 25° to 35°.

9. The soil manipulating device of claim 8 wherein said top surface of said first secondary point is oriented with respect to said first side of said center point at an angle of about 140°;

said bottom surface of said first secondary point is oriented with respect to said first side of said center point at an angle of about 130°;

said top surface of said first secondary point is oriented with respect to said bottom surface of said first secondary point at an angle of about 30°;

said top surface of said center point is oriented with respect to said bottom surface of said center point at an angle of about 40°;

said top surface of said second secondary point is oriented with respect to said first side of said center point at an angle of about 140°;

said bottom surface of said second secondary point is oriented with respect to said first side of said center point at an angle of about 130°; and said top surface of said second secondary point is oriented with respect to said bottom surface of said second secondary point at an angle of about 30°.

10. A tilling shank as, defined in claim 7, comprising:

a center point having a top surface, a bottom surface, a first side, and a second side wherein said top surface tapers to meet said bottom surface thereby forming a center point leading edge;

a first secondary point fixedly attached to said first side of said center point, said first secondary point having a top surface and a bottom surface, wherein said top surface tapers to meet said bottom surface thereby forming a first secondary point leading edge, wherein most of said top surface of said first secondary point is lower than said top surface of said center point and said bottom surface of said first secondary point is higher than said bottom surface of said center point; and a second secondary point fixedly attached to said second side of said center point, said second secondary point having a top surface and a bottom surface, wherein said top surface tapers to meet said bottom surface thereby forming a second secondary point leading edge, wherein most of said top surface of said second secondary point is lower than said top surface of said center point and said bottom surface of said second secondary point is higher than said bottom surface of said center point.

11. The soil manipulating device of claim 10 wherein said top surface of said first secondary point is oriented with respect to said first side of said center point at an angle of 120° to 150°;

said bottom surface of said first secondary point is oriented with respect to said first side of said center point at an angle of 120° to 150°;

said top surface of said first secondary point is oriented with respect to said bottom surface of said first secondary point at an angle of 25° to 35°;

said top surface of said center point is oriented with respect to said bottom surface of said center point at an angle of 35° to 45°;

said top surface of said second secondary point is oriented with respect to said first side of said center point at an angle of 120° to 150°;

said bottom surface of said second secondary point is oriented with respect to said first side of said center point at an angle of 120° to 150°; and said top surface of said second secondary point is oriented with respect to said bottom surface of said second secondary point at an angle of 25° to 35°.

12. The soil manipulating device of claim 11 wherein said top surface of said first secondary point is oriented with respect to said first side of said center point at an angle of about 140°;

said bottom surface of said first secondary point is oriented with respect to said first side of said center point at an angle of about 130°;

said top surface of said first secondary point is oriented with respect to said bottom surface of said first secondary point at an angle of about 30°;

said top surface of said center point is oriented with respect to said bottom surface of said center point at an angle of about 40°;

said top surface of said second secondary point is oriented with respect to said first side of said center point at an angle of about 140°;

said bottom surface of said second secondary point is oriented with respect to said first side of said center point at an angle of about 130°; and said top surface of said second secondary point is oriented with respect to said bottom surface of said second secondary point at an angle of about 30°.

13. A soil manipulating device comprising a shank for tilling a seed bed;

a pair of coulter blades positioned behind said shank on opposite sides of said groove for closing said groove;

a rear finishing device positioned behind said coulter blades;

a connector assembly which communicates displacement to said coulter blades;

a top parallel arm having a front end and a rear end wherein said front end is pivotally connected to said shank, and said rear end is pivotally connected to said connector assembly;

a bottom parallel arm having a front end and a rear end wherein said front end is pivotally connected to said shank, and said rear end is pivotally connected to said connector assembly;

a rear arm having a front end and a rear end wherein said front end is pivotally connected to said connector assembly and said rear end is connected to said rear finishing device;

a first spring having a top end and a bottom end, wherein said bottom end is attached to said bottom parallel arm and said top end is attached to an adjustment arm; and wherein a forward end of said adjustment arm is pivotally connected to said top parallel arm at a first connection point and a rear end of said adjustment arm being adapted to communicate any downward force imparted to the adjustment arm to said upper parallel arm.

14. The soil manipulating device of claim 13 further comprising a second spring having a front end and a rear end, wherein said front end is attached to said connector assembly and said rear end is attached to said rear arm.

15. The soil manipulating device of claim 14 further comprising a second bias adjustment means for adjusting the spring biasing force of said second spring.

16. The soil manipulating device of claim 15 wherein said rear arm is bent downward and wherein said second bias adjustment means comprises a first pin for attaching said rear end of said second spring in one of plural positions determined by plural holes in said rear arm which are adapted to receive said first pin.

17. The soil manipulating device of claim 15 wherein said rear arm is substantially straight and wherein said second bias adjustment means comprises a first pin for attaching said front end of said second spring in one of plural positions determined by plural holes in said connector assembly which are adapted to receive said first pin.

18. The soil manipulating device of claim 13 wherein said adjustment arm further comprises a first bias adjustment means for adjusting the spring biasing force of said first spring and, depth adjustment means for adjusting the working depth of said coulters in relation to said shank.

19. A method of controlling the soil penetration depth of a pair of coulter blades on a soil manipulation device also having soil tilling shank preceding the coulter blades and a rear finishing device following the coulter blades wherein the tilling shank, coulter blades, and rear finishing device are directly connected by a framework supporting the coulter blades and having a coulter spring for providing downward force on the coulter blades, the steps comprising:

adjusting the coulter spring to a desired one of plural predetermined bias force settings;

setting the desired working depth of the coulter blades and framework in relation to the tilling shank;

propelling the soil manipulation device forward;

lowering the tilling shank, coulter blades, and rear finishing device into the soil;

raising the coulter blades in response to changing field conditions by transmitting an upward force to the framework when changing field condition displace the rear finishing device upwards, said upward force being communicated to the framework by means of a rear arm pivotally attached to the frame work at first end and the rear finishing device at a second end and a rear arm spring attached to the framework at a first end and to the rear arm at a second end.

20. A soil manipulating device comprising:

a shank for tilling a seed bed and forming a groove in soil:

a coulter assembly attached directly to said shank, the coulter assembly including a pair of coulter blades biased downwardly toward the soil, and positioned behind said shank on opposite sides of said groove for closing said groove;

a rear finishing device for smoothing and finishing the soil by rolling over the soil behind the coulter blades, the rear finishing device being attached directly to the coulter assembly, and being downwardly biased toward the soil;

wherein movements of said rear finishing device caused by the soil are communicated to said coulter assembly to counteract the coulter blade downward bias.

* * * * *